Figure 1:
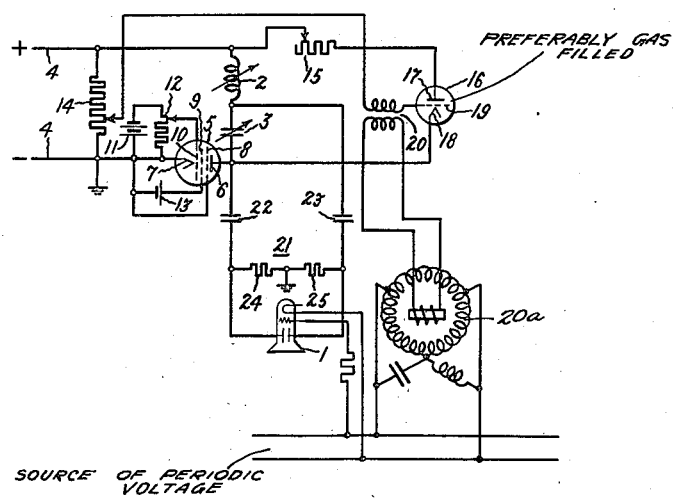

April 30, 1940.   H. W. PIEPLOW   2,199,246
ELECTRIC VALVE CIRCUIT
Filed May 19, 1938

SOURCE OF PERIODIC VOLTAGE

Inventor:
Hans W. Pieplow,
by Harry E. Dunham
His Attorney.

Patented Apr. 30, 1940

2,199,246

UNITED STATES PATENT OFFICE 2,199,246

ELECTRIC VALVE CIRCUIT

Hans Werner Pieplow, Berlin, Germany, assignor to General Electric Company, a corporation of New York Application May 19, 1938, Serial No. 208,942 In Germany June 29, 1937

4 Claims. (Cl. 250—36)

My invention relates to electric valve circuits and more particularly to electric valve circuits for producing periodic electrical quantities such as periodic voltages.

Electric valve circuits of the single valve inverter type have been employed to produce a periodic timing quantity such as a periodic voltage. This type of circuit has found considerable application in connection with the energization of the deflecting plates or electrodes of Braun valves or cathode ray oscillographs. In applications of this nature, it is necessary that the periodic voltages have wave forms of predetermined proportions and that the wave forms be symmetrical so that the visual reproduction of the phenomena to be observed is accurate and precise. One type of circuit for producing periodic timing voltages is the arrangement which employs a source of unidirectional current and obtains the periodic voltages by periodically discharging a capacitance which has been charged from the direct current source. Many of the prior art arrangements utilizing this general type of circuit have not been entirely satisfactory due to the fact that the wave forms of the periodic voltages have been unsymmetrical. In accordance with the teachings of my invention described hereinafter, I provide a new and improved electric valve circuit for generating a periodic voltage of symmetrical wave form.

It is an object of my invention to provide a new and improved electric valve circuit.

It is another object of my invention to provide a new and improved electric valve circuit for generating a periodic electrical timing quantity.

It is a further object of my invention to provide a new and improved electric valve circuit for producing a periodic voltage of symmetrical wave form.

In accordance with the illustrated embodiment of my invention, I provide a new and improved circuit for generating a periodic voltage of symmetrical wave form. The system comprises a serially connected inductance and a capacitance, the latter being charged from a source of unidirectional current through an electric valve means of the high vacuum type. The electric valve means is operated within the saturated region so that the capacitance is charged at a substantially constant rate, and hence the voltage appearing across the capacitance varies substantially linearly. To periodically discharge the capacitance, I provide a circuit including an adjustable damping resistance and an electric valve means which are connected in series relation across the serially connected inductance and capacitance. The natural frequency of oscillation of the circuit including the capacitance, the inductance, the resistance and the discharge electric valve is at least ten times greater than that of the periodic voltage appearing across the terminals of the capacitance. A load circuit is connected to be energized in response to the periodic voltage appearing across the terminals of the capacitance.

Figure 2:
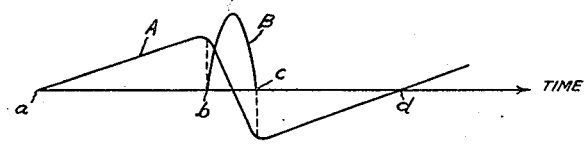

For a better understanding of my invention, reference may be had to the following description taken in connection with the accompanying drawing, and its scope will be pointed out in the appended claims. Fig. 1 diagrammatically illustrates an embodiment of my invention as applied to a circuit for energizing the electrodes of a Braun valve, and Fig. 2 represents certain operating characteristics of the circuit which produces the periodic voltage.

Referring now to Fig. 1 of the accompanying drawing, my invention is diagrammatically illustrated as applied to a circuit for energizing a load device such as a Braun electric valve 1. The system for producing the periodic control voltage comprises a serially connected inductance 2 and a capacitance 3. The capacitance 3 is charged from a source of direct current 4 through the inductance 2. Capacitance 3 and inductance 2 may be adjustable. In order to charge the capacitance at a substantially constant rate, I employ a suitable electric valve 5 of the high vacuum type. The electric valve 5 may be a pentode comprising an anode 6, a cathode 7, a suppressor grid 8, a screen grid 9 and a control grid 10. To impress on the control grid 10 an adjustable negative unidirectional voltage, I employ a circuit including a battery 11 and a voltage divider 12. A suitable source of positive voltage, such as a battery 13, may be employed to impress a positive voltage relative to the cathode upon the screen grid 9. A voltage divider comprising a resistance 14 is connected across the terminals of the direct current source 4.

To periodically discharge the capacitance 3 through the inductance 2, I provide a circuit including an adjustable damping resistance 15 and an electric valve 16 which are connected in series relation across the serially connected inductance 2 and capacitance 3. The electric valve 16 is preferably of the type employing an ionizable medium, such as a gas or a vapor, and includes an anode 17, a cathode 18 and a control grid 19.

Where it is desired to maintain a synchronized relation between the periodic voltage appearing across the terminals of the capacitance 3 and the voltage of another source of periodic voltage, such as the voltage of an alternating current circuit, a transformer 20 may be connected in series relation with the control grid 19 of the electric valve 16 to effect this relationship. One terminal of the secondary winding of the transformer 20 is connected to the control grid 19 and the other terminal is connected to an adjustable tap on the resistance 14 of the voltage divider which is connected across the direct current circuit 4.

In order that the voltage impressed across the electrodes of the electric valve 1 be symmetrical, I provide a filter circuit 21 including blocking condensers 22 and 23 and a pair of serially connected resistances 24 and 25. A common juncture of the resistances 24 and 25 may be connected to ground and the negative terminal of the direct current source 4 may also be connected to ground. By virtue of this arrangement, the periodic voltage impressed on the electrodes of the electric valve 1 is symmetrical with respect to the positive and negative portions thereof, and the periodic voltage is also symmetrical with respect to ground potential.

The operation of the embodiment of my invention illustrated in Fig. 1 will be explained by considering the system when it is operating to produce a periodic voltage for energizing the electrodes of the electric valve 1. The capacitance 3 is charged at a substantially constant rate from the direct current source 4 through the inductance 2 and the electric valve means 5. A constant rate of charge of the capacitance 3 is obtained by operating the electric valve means 5 within the saturated region. Due to the fact that the capacitance 3 is charged at a substantially constant rate, the voltage appearing across the terminals of the capacitance varies in a linear manner. Electric valve 16 is rendered conductive periodically by the resultant voltage which is impressed on the control grid 19. The time at which the electric valve 16 is rendered conductive may be synchronized with respect to another source of periodic voltage by energizing the transformer 20 from that source. Of course, if it is desired to obtain a predetermined phase displacement between the voltage of the other source and the periodic voltage generated by the system, suitable phase shifting apparatus, such as a rotary phase shifter 20a may be interposed between the other source and the transformer 20. When the electric valves 16 is rendered conductive, the capacitance 3 discharges through a circuit including the inductance 2, the damping resistance 15 and electric valve 16. The damping resistance 15 is adjusted so that the discharge circuit for the capacitance 3 is oscillatory and so that the discharge current is of substantially sine wave form. By such proportioning of the constants of the discharge circuit, the periodic voltage generated is of symmetrical wave form. Of course, the natural period of oscillation of the discharge circuit may be adjusted by adjusting the resistance 15, inductance 2 and capacitance 3.

A better understanding of the operation of the embodiment of my invention shown in Fig. 1 may be had by considering the operating characteristics in Fig. 2. Curve A represents the voltage which is impressed across the electrodes of the electric valve 1. It will be noted that the portions of the curve A lying within the regions a—b and c—d are linear due to the fact that the capacitance 3 is charged at a substantially constant rate. During the interval a—b, the capacitance 3 is charged from the direct current source 4, positive current flowing through the inductance 2, capacitance 3 and electric valve means 5. At time b, the electric valve 16 is rendered conductive, effecting discharge of the capacitance 3 through the inductance 2, resistance 15 and electric valve 16. The curve B represents the discharge current flowing in the discharge circuit. It will be noted that this current is of substantially sine wave form. In consequence, the portion of curve A lying within the region b—c is symmetrical, imparting to the curve B the desired symmetry of the positive and negative portions of the curve. At time c, capacitance 3 has been charged to the reverse polarity and the voltage appearing across the capacitance 3 is substantially twice the voltage appearing at time b. Of course, at time c the electric valve 16 is rendered nonconductive due to the reversal of the applied anode-cathode voltage and the capacitance 3 is charged during the interval c—d.

The discharge circuit including the adjustable resistance 15 is proportioned so that the natural frequency of the discharge circuit is substantially greater than the frequency of the periodic voltage appearing across the terminals of the capacitance 3. For example, the discharge circuit may be proportioned so that the natural frequency of oscillation of the discharge circuit is at least ten times greater than the frequency of the periodic voltage appearing across capacitance 3.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of direct current, a serially connected inductance and capacitance, means for charging said capacitance at a substantially constant rate from said source through said inductance, a circuit including an electric valve and being connected across the serially connected inductance and capacitance for periodically discharging said capacitance to produce a periodic electrical quantity, said electric valve having a control member for controlling the conductivity thereof, a load circuit connected to be energized in accordance with the voltage appearing across said capacitance, the natural frequency of oscillation of said circuit and the inductance and capacitance being substantially greater than the frequency of said periodic electrical quantity, a source of periodic voltage, and means for energizing said control member to synchronize said periodic electrical quantity relative to the voltage of said second mentioned source.

2. In combination, a source of direct current, a serially connected inductance and capacitance, means for charging said capacitance at a substantially constant rate from said source through said inductance, a circuit including an electric valve and being connected across the serially connected inductance and capacitance for periodically discharging said capacitance to produce a periodic electrical quantity, said electric valve having a control member for controlling the conductivity thereof, a load circuit connected to be energized in accordance with the voltage appearing across said capacitance, the natural frequency of oscillation of said circuit and the inductance and capacitance being at least ten times greater than the frequency of said periodic electrical quantity, a source of periodic voltage, and means for energizing said control member to synchronize said periodic electrical quantity relative to the voltage of said second mentioned source.

3. In combination, a source of direct current, a serially connected inductance and capacitance, means for charging said capacitance at a substantially constant rate from said source through said inductance, a discharge circuit for said capacitance comprising a serially connected resistance and an electric valve for periodically discharging said capacitance through said inductance to produce a periodic electrical quantity, said electric valve having a control member for controlling the conductivity thereof, a load circuit energized in response to the voltage appearing across said capacitance, said discharge circuit in conjunction with said capacitance and said inductance constituting an oscillatory circuit the natural frequency of which is at least ten times greater than the frequency of said periodic electrical quantity, a source of periodic voltage, and means for energizing said control member to synchronize said periodic electrical quantity relative to the voltage of said second mentioned source.

4. In combination, a source of direct current, a serially connected inductance and capacitance, means for charging said capacitance from said source through said inductance, a discharge circuit connected across the serially connected inductance and capacitance and comprising an adjustable resistance and an electric valve means for periodically discharging said capacitance to produce a periodic voltage, said electric valve means having a control member for initiating discharge of said capacitance, a load circuit connected across said capacitance, said discharge circuit and said inductance and capacitance comprising an oscillatory circuit the natural frequency of which is substantially greater than the frequency of said periodic voltage, a source of periodic voltage, and means energized from said last mentioned source for impressing on said control member a periodic voltage to synchronize said first mentioned periodic voltage with respect to the voltage of said second mentioned source.

HANS WERNER PIEPLOW.